June 22, 1943.   C. H. SCOTT   2,322,719
APPARATUS FOR THE TREATMENT OF SLURRIES OR LIQUID SOLIDS MIXTURES
Filed March 6, 1942   6 Sheets-Sheet 1

INVENTOR
CHARLES H. SCOTT
BY *Austin Middleton*
ATTORNEY

INVENTOR
CHARLES H. SCOTT
BY
ATTORNEY

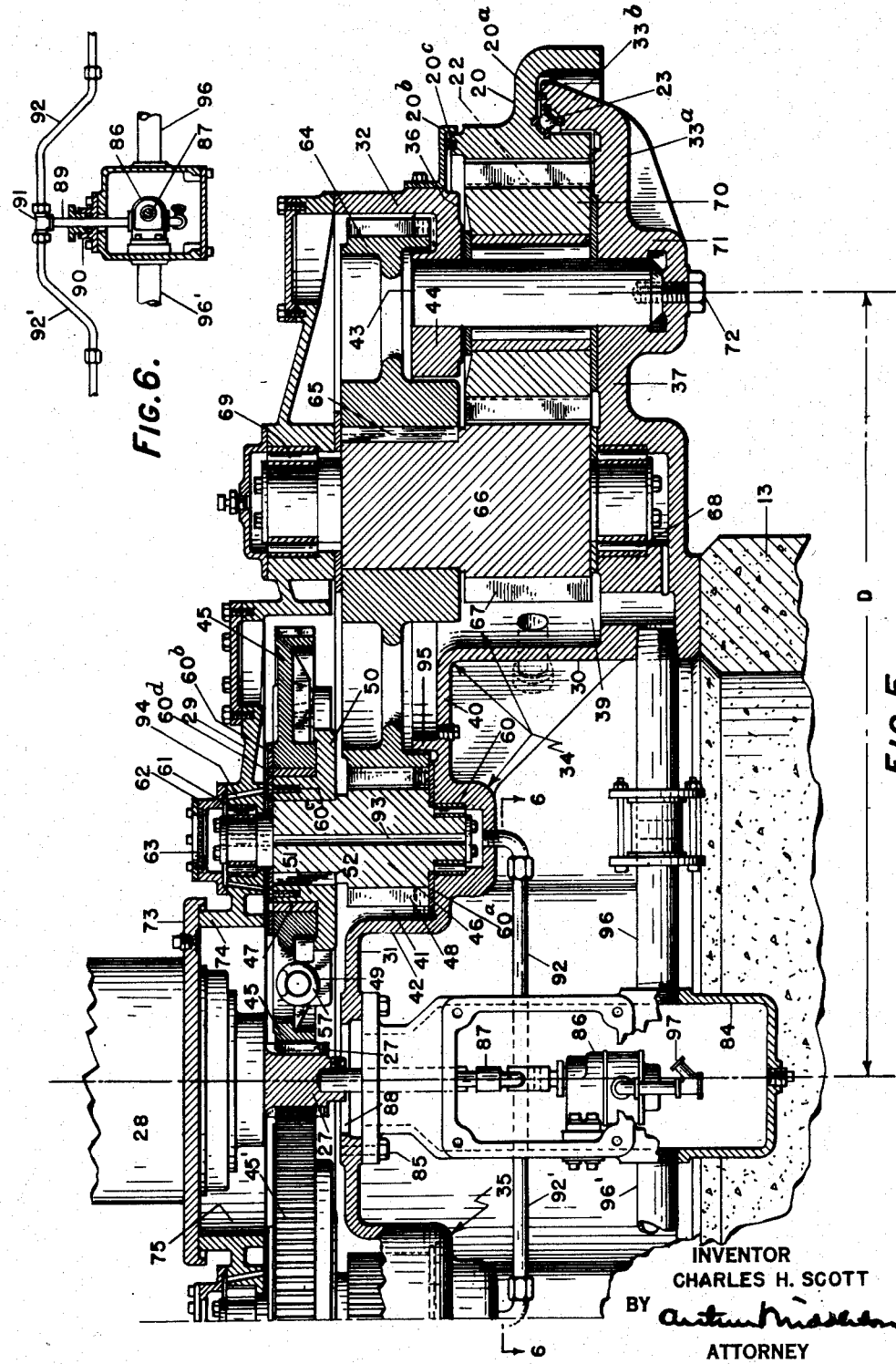

June 22, 1943.  C. H. SCOTT  2,322,719
APPARATUS FOR THE TREATMENT OF SLURRIES OR LIQUID SOLIDS MIXTURES
Filed March 6, 1942  6 Sheets-Sheet 4
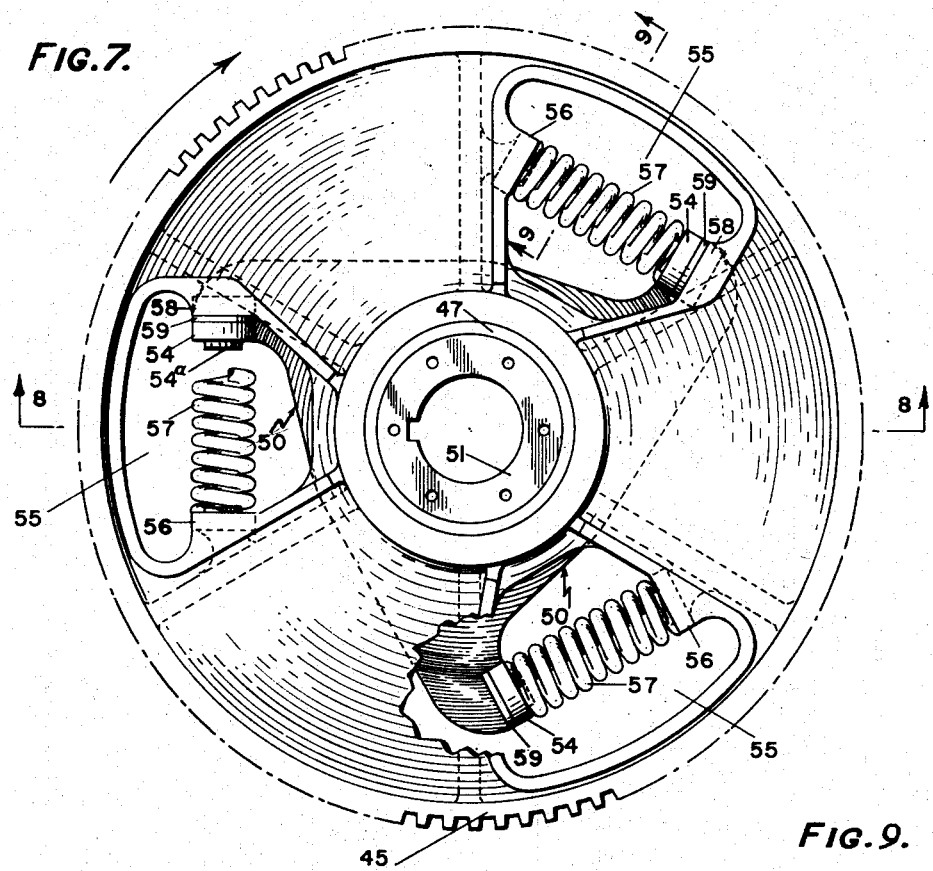
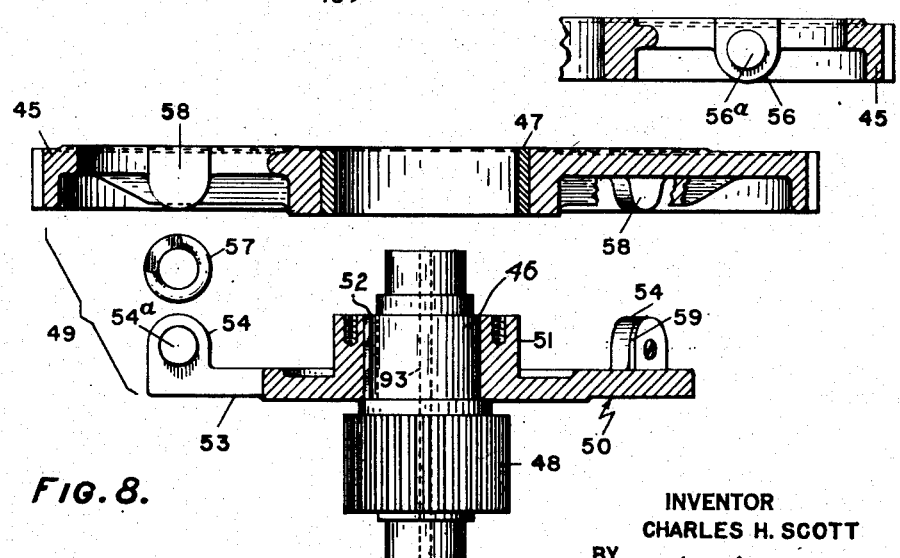
INVENTOR
CHARLES H. SCOTT
BY
ATTORNEY

INVENTOR
CHARLES H. SCOTT
BY
ATTORNEY

June 22, 1943.  C. H. SCOTT  2,322,719
APPARATUS FOR THE TREATMENT OF SLURRIES OR LIQUID SOLIDS MIXTURES
Filed March 6, 1942   6 Sheets-Sheet 6
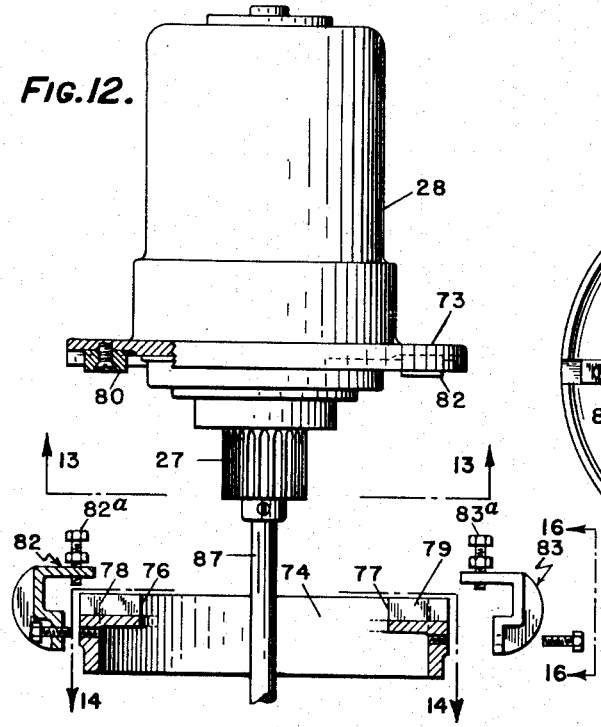
FIG.12.
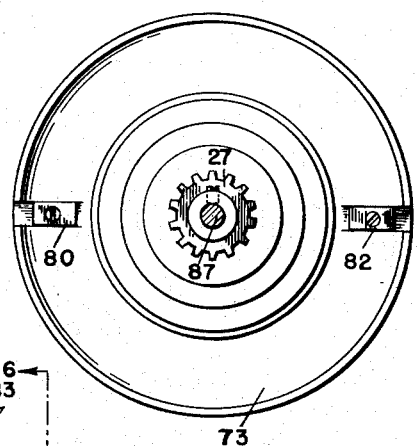
FIG.13.
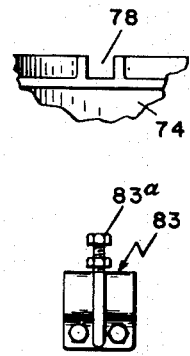
FIG.15.
FIG.16.
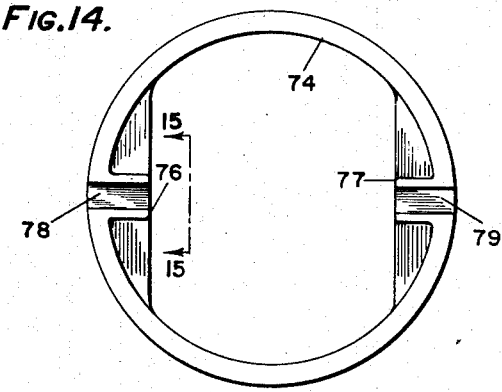
FIG.14.
INVENTOR
CHARLES H. SCOTT
BY
ATTORNEY Patented June 22, 1943

2,322,719

UNITED STATES PATENT OFFICE 2,322,719

APPARATUS FOR THE TREATMENT OF SLURRIES OR LIQUID SOLIDS MIXTURES

Charles H. Scott, Westport, Conn., assignor to The Dorr Company, New York, N. Y., a corporation of Delaware Application March 6, 1942, Serial No. 433,574

3 Claims. (Cl. 74—410)

This invention relates to apparatus for the treatment of slurries or liquid solids mixtures, comprising a detention tank in which operates a rotary stirrer or raking structure revolving about a vertical axis. Examples of such apparatus are slurry mixers, slurry agitators, or slurry agitator storage tanks, or sedimentation tanks. In the slurry tank the rotary structure may operate largely as a stirrer, whereas in the sedimentation tank it operates largely as a sediment conveying and collecting means.

The rotary structure has a central vertical portion driven to rotate about a vertical axis and provided with radially extending arms having means for stirring the slurry or for raking sediment. Usually the central portion of the rotary structure is unitary and concentric with a large gear, namely, the low speed gear driven by the reduction gear mechanism. This large or low speed gear also known as the bull gear is usually found to be operatively supported by means of an annular thrust bearing or turntable construction.

It is one object of this invention to produce an improved reduction gear drive mechanism whereby it is possible to impart to the rotary structure a substantially true or balanced driving torque. Differently expressed the object is to overcome the resistance or torque load imposed upon the rotary structure as by the heavy slurry or by the sedimented matter, with a minimum of power requirement and with a minimum of non-torque stresses being imposed upon the mechanism, in short, to produce a highly efficient drive mechanism.

To this end the improved drive mechanism provides for a plurality of gear trains that are substantially resiliently interbalanced so that substantially equal shares of the driving torque are transmitted from the primary or driving shaft such as a motor shaft, to a plurality of points of meshing engagement with the low speed shaft.

Ordinarily, if equal component portions of the total driving torque were to be transmitted from a high speed rotary driving element or gear, through a plurality of gear trains, to the various points of the low speed gear, uniform distribution would be difficult to realize because of a degree of manufacturing inaccuracies inherent to the gear teeth, which inaccuracies may be in proportion to the size of the gear, and may be particularly noticeable in a large diameter low speed gear or bull gear, such, for instance, as employed in the type of commercial apparatus herein contemplated. Such inaccuracy may cause a substantially full torque load to shift from one gear train to another, thereby overloading either the one or the other gear train and reducing the torque efficiency of the drive, or it may at least cause the total torque to be unequally shared by the parallel operating gear trains. The result is noisy operation, increased wear and tear, and extra power consumption.

It is therefore an important feature of this improved drive mechanism that these difficulties are substantially avoided by providing cushioning-, or resilient-, or shock absorbing-torque transmitting means whereby the torque loads in the respective gear trains are substantially interbalanced. That is to say, each gear train has interposed in it resilient torque transmitting or compensating means whereby it may absorb excess torque, and cause the other gear train or trains to assume additional burden equivalent to the absorber excess torque, thus effecting substantially equal torque load distribution to all gear trains.

In one embodiment of the improved drive mechanism there is provided a vertically disposed motor shaft substantially co-axial with the rotary axis of the low speed gear that is supported by stationary annular bearing means. The drive motor is disposed centrally above the low speed gear and is provided with a drive pinion herein called the motor pinion. A pair of gear trains extend symmetrically from the motor pinion into meshing engagement with diametrically opposed points of the low speed gear, each gear train being provided with resilient torque absorbing or compensating means for the purpose set forth.

In this embodiment it is a specific feature that the motor is adjustable in a specific horizontal direction, namely, at right angles to the direction of the diameter of the low speed gear, which defines the opposed points of driving engagement between the gear trains and the low speed gear.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of other possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 4:
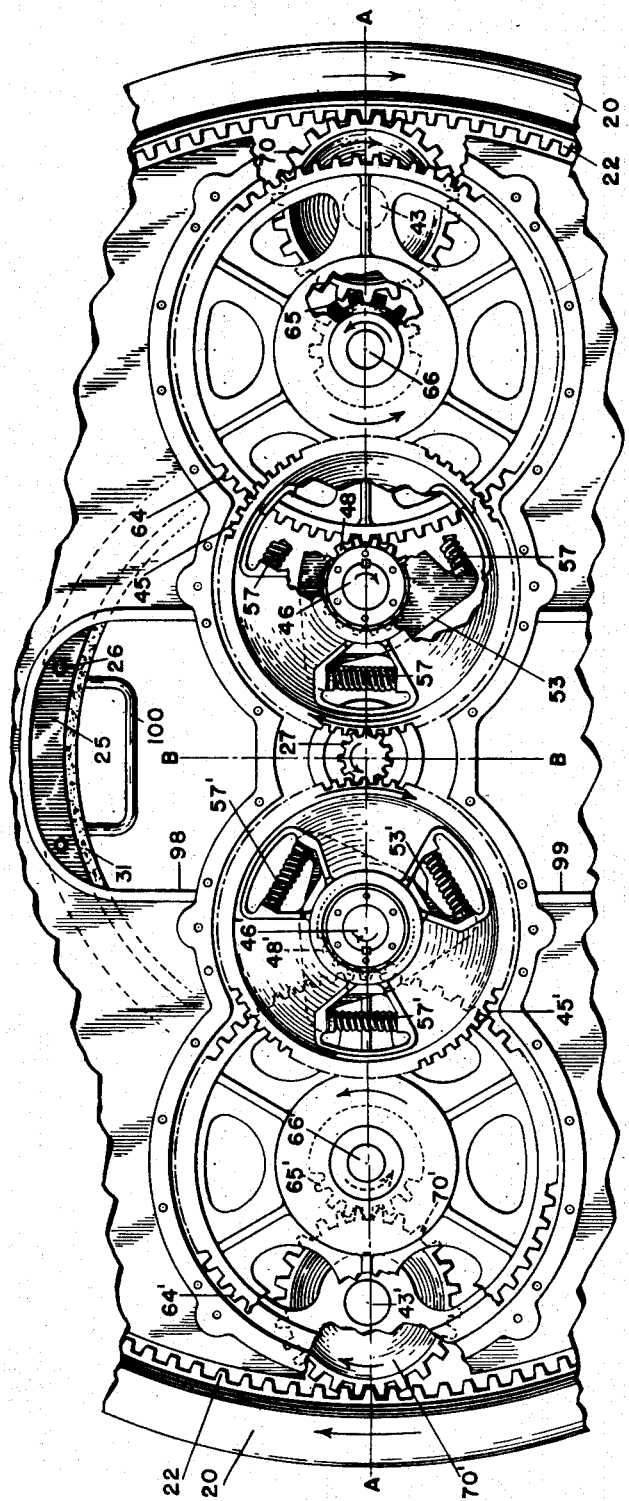
Figure 2:
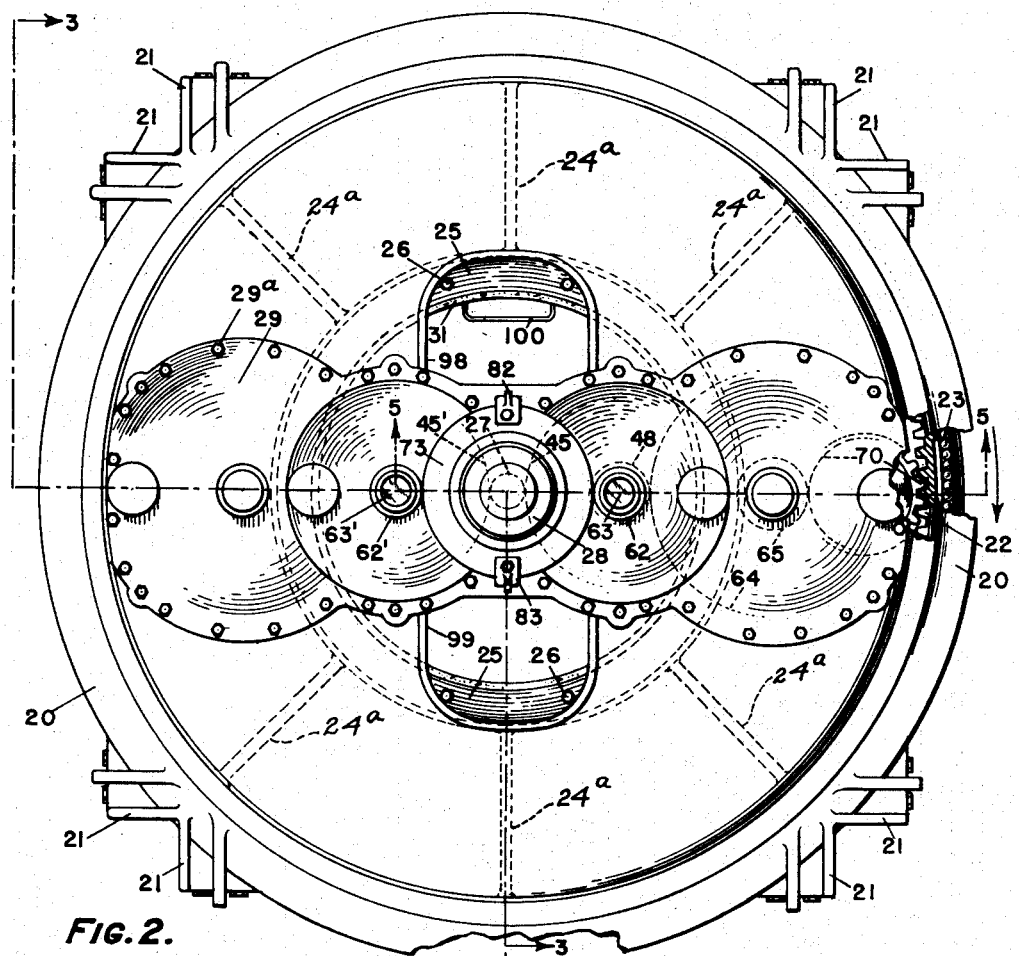
Fig. 2 is an enlarged top view upon the drive mechanism.

Fig. 4 is a still further enlarged top view similar to Fig. 2 but broken off in parts, and with the centrally disposed motor and the top cover portion removed, so as to show a pair of symmetrically disposed reduction gear trains each of which embodies the resilient torque equalizing means according to this invention; although the motor is shown removed, the motor pinion is shown as having remained in this view and as the driving element for both gear trains.

Figure 10:
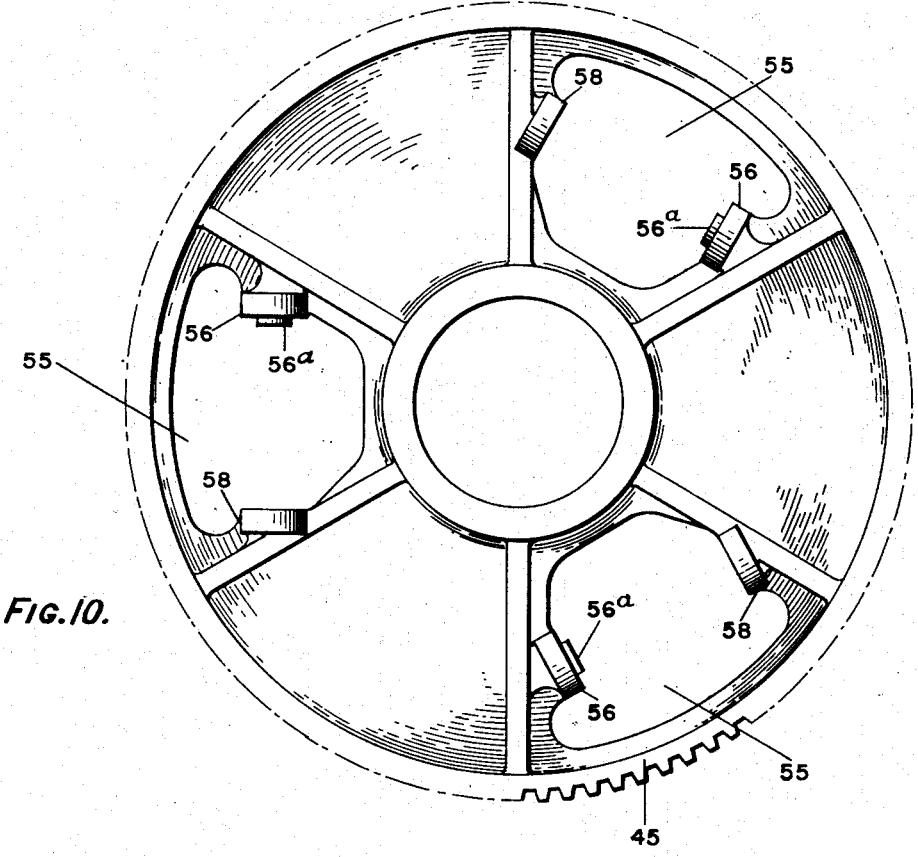
Figure 11:
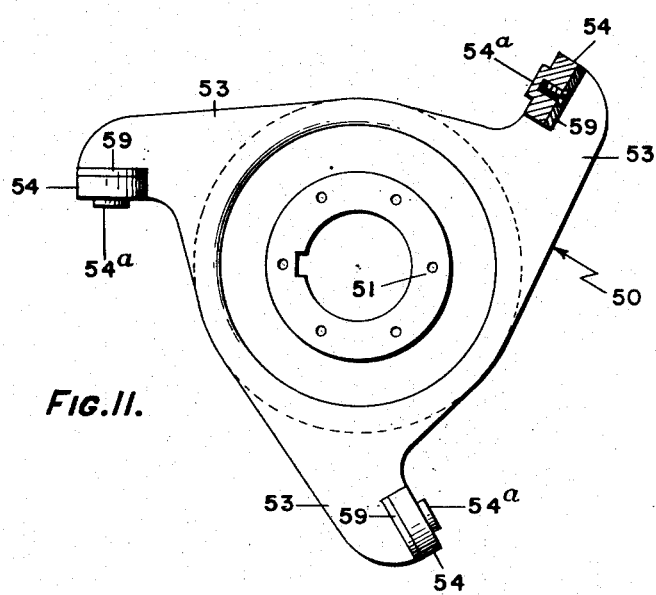

Fig. 5 is a still further enlarged section along the line 5—5 in Fig. 2, showing the arrangement of one of the symmetrical reduction gear trains;

Fig. 6 is a detail cross-section of an oil circulating pump arrangement for the drive gear trains;

Fig. 7 is a detail top view upon the resilient torque equalizing or compensating device that is functionally interposed between an upper large gear and a lower smaller gear or pinion, all concentrically disposed;

Fig. 8 is a section along the line 8—8 in Fig. 7, but with parts drawn apart to show the component parts of the resilient torque equalizing device;

Fig. 9 is a detail section along the line 9—9 in Fig. 7;

Fig. 10 is a view from below of the upper large gear that is associated with the torque equalizing device, but is shown stripped of all associated parts;

Fig. 11 is a detail top view of a spider element that forms part of the resilient torque transmitting and equalizing device;

Fig. 12 shows the means for permitting horizontal adjustment of the drive motor, with parts drawn apart;

Fig. 13 is a bottom view along the line 13—13 upon the motor shown in Fig. 12;

Fig. 14 is a plan view along the line 14—14 taken from Fig. 12;

Fig. 15 is a detail view taken along line 15—15 in Fig. 14; and

Fig. 16 is a detail view taken along line 16—16 in Fig. 12.

Figure 1:
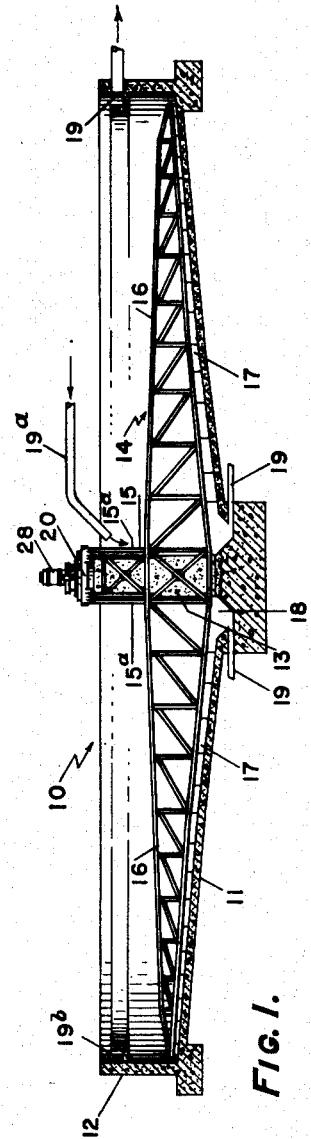
Fig. 1 shows the cross section of a slurry treatment or storage tank having a rotary raking structure to which the improved drive mechanism of this invention is shown to be applied.

In Fig. 1 the invention is shown to be applied to a sedimentation or slurry treatment apparatus shown in somewhat diagrammatic fashion. This apparatus comprises a tank 10 having a tank bottom 11, a marginal wall 12, a pier 13 rising from the center of the tank bottom and herein called the center pier. Upon the center pier is rotatably mounted a rotary sediment raking or stirring structure 14. This rotary structure in turn comprises a central cage portion 15 surrounding the center pier and rotatably mounted thereon. The cage portion 15 is shown to comprise vertical structural members 15ª. Raking or stirring arms 16 extend radially from the cage portion 15 and engage sediment as the structure rotates about the center pier, raking or ploughing blades 17 on the rake arms being effective to stir sediment or to convey it from the outlying zones on the tank bottom towards an annular trough 18 in the center portion of the tank bottom and surrounding the center pier, whence the conveyed or collected sediment may be withdrawn as by way of exit conduits 19. A feed inlet connection for the tank 10 is indicated at 19ª, and an annular overflow launder for clarified liquid at 19ᵇ.

Figure 3:
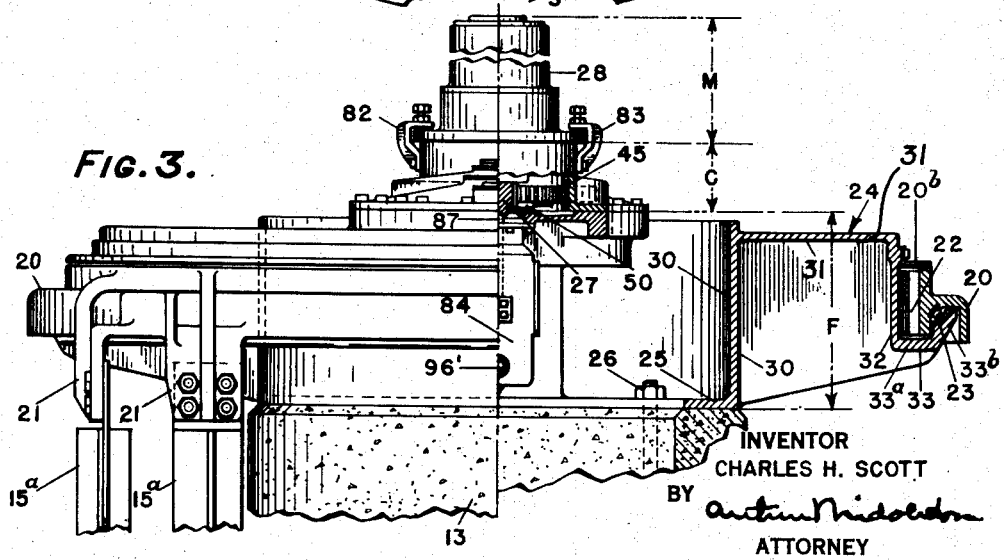
Fig. 3 is a part sectional side view taken upon Fig. 2.

Figs. 2 and 3 show more clearly how the rotary structure 14 and the drive mechanism therefor are mounted upon the center pier 13. The cage portion 15 is formed at the top with an annular member 20 having downwardly extending lugs 21 to which are fastened the upper end portions of the vertical structural members 15ª of the central cage portion 15 of the rotary structure 14. The annular member 20 is provided with internal gear teeth 22 and constitutes what is herein called the bull gear whereby the structure 14 is rotated through drive mechanism hereinafter described. The annular member or bull gear 20 is rotatably supported by way of an annular bearing or ball bearing 23 upon a frame structure 24 mounted upon the hollow center pier 13 by way of its bottom flange 25 and anchor bolts 26. The frame structure 24 has symmetrically arranged pockets containing respective symmetrical reduction gear trains both of which are simultaneously driven by a central pinion 27 herein called the motor pinion fastened to and driven by the shaft of a vertically disposed drive motor 28. The drive motor in turn is supported by a cover portion 29 overlying the reduction gear trains and bolted as at 29ª to the frame structure 24. Referring to Fig. 3, the height of the frame structure 24 is designated as "F," the height of the gear cover portion 29 as "C," and the height of the drive motor as "M." The frame structure 24 is shown to be a casting having several stiffening ribs 24ª and 24ᵇ. The frame structure 24, in further detail, comprises an inner cylindrical portion 30 rising from the bottom flange 25 and terminating in a horizontally extending top portion 31 from the outer marginal portion of which there extends downwardly a skirt portion 32 the lower end portion of which forms an extreme outer annular trough-like portion 33 which receives the bull gear 20 and provides the annular bearing or ball bearing 23 for the bull gear. The trough-like portion 33 has a flat annular bottom 33ª and an outer annular portion 33ᵇ rising therefrom. The rotary bull gear 20 is sealed at its underside against the portion 33ᵇ of the stationary frame 24 by means of a felt strip 20ª, and at its upper side it is sealed by means of an annular cover portion 20ᵇ and a felt strip 20ᶜ. The basic form of the frame structure 24 as just defined, is formed with, or intersected by a pair of symmetrically arranged, upwardly open pockets 34 and 35, which pockets may be said to extend radially in opposite directions from the center of the frame structure 24. Therefore, a radial section through the frame structure 24 (see Fig. 5) will show up the configuration or contours of the pocket 34, which pocket in a symmetrical sense is identical to the opposite pocket 35. It will therefore suffice to describe in further detail the pocket 34 only.

The contours of the pocket 34 follow rather closely the contours of a reduction drive gear train mounted in it and comprising gears all of which are rotatable about vertical axes and which transmit driving power from the high speed motor pinion 27 to the low speed bull gear 20. The distance from the center of the first gear to the center of the last gear of this gear train is designated as "D." The meshing engagement between the bull gear 20 and the associated gear of the reduction gear train is effected through an opening 36 provided in the depending skirt portion 32. Consequently the outer end of the pocket 34 may be said to start at the outer rising wall portion 33ᵇ of the trough-like portion 33 (see Fig. 5). The contour of the pocket comprises the corresponding portion of the flat annular bottom 33ᵃ of the trough-like portion 33 which in turn merges horizontally into a flat bottom portion 37 which in turn merges into the bottom flange 25 of the frame structure 24. The contour of the pocket then steps up from the flange 25 leading part way up along the inner cylindrical portion 30, thus forming with the flat bottom portion 37, the flat bottom 33ᵃ, and the corresponding part of the extreme outer rising wall portion 33ᵇ, a relatively large pocket section 39. From the inner cylindrical portion 30 the contour then continues horizontally, forming with the portion 30 an upward step and also forming the horizontal bottom portion 40 of a second or inner smaller pocket section 41. This inner pocket section 41 is further defined by a further rising step or vertical wall portion 42 that terminates in and merges into the central part of the top portion 31 of the frame structure 24.

The pocket 34 comprising the larger pocket section 39 and the stepped-up smaller pocket section 41, is provided with thrust bearings which constitute the lower bearing supports for the various vertical shafts or counter-shafts of the reduction gear train. Accordingly, the upper ends of these vertical reduction gear shafts have their upper bearings in the cover portion 29, that is, all except the gear shaft 43 closest to the bull gear 20, the upper end of which gear shaft is journaled in a lug or eye 44 that extends inwardly from the depending skirt portion 32 of the frame structure 24.

Describing now the train of reduction gears proper and beginning at the driving end, the motor pinion 27 drives a large gear 45 that has a loose fit with respect to the gear shaft or counter-shaft 46, a bearing sleeve 47 being shown in the gear. Below the gear 45 the counter-shaft 46 carries fixed thereto a pinion 48 here shown to be integral with the counter-shaft 46. Driving torque is transmitted from the large gear 45 to the pinion 48 by way of a resilient or spring cushioned torque transmitting device 49 which may be said to act as a resilient torque compensating device the details of which are more clearly shown in Figs. 7 and 8. This torque transmitting device comprises a three-armed spider element 50, the hub portion 51 of which is keyed to the counter-shaft 46 as at 52. The ends of the spider arms 53 have upstanding lugs 54 which extend into corresponding openings 55 of the large gear 45 above. The openings 55 are furthermore formed with the lug portions 56 which are horizontally aligned with the lugs 54 of the spider arms 53, so that compression springs 57 may be placed between each lug 54 of the spider and each corresponding associated lug portion 56 of the gear 45. When no torque is being transmitted from the gear 45 through the springs 57 and the spider element 50, to the pinion 48, the springs will expand until the lugs 54 of the spider engage abutment portions 58 provided on the gear 45. Each lug 54 of the spider element has fastened thereto a disk 59 of hard rubber or other impact absorbing material to avoid chattering of the lugs 54 engaging upon the abutment portions 58 of the gear 45. Fig. 8 shows the parts of the resilient torque transmitting device in a drawn-apart condition, indicating that the gear 45 with its bearing sleeve 47 has a loose or running fit on the hub portion 51 of the spider element 50. Fig. 10 shows a view upon the underside of the gear 45 stripped of the torque transmitting springs and clearly showing the lug portions 56 as well as the corresponding abutment portions 58 opposite thereto. It will be noted that each lug portion 56 has a centering portion 56ᵃ for locating one end of a compression spring 57, the other end of the compression spring 57 being centered and located upon a corresponding centering portion 54ᵃ on the lug 54 of the spider element.

The first counter-shaft 46 has a lower or thrust bearing 60 provided in the horizontal portion 40 of the smaller pocket section 41, and an upper or guide bearing 61 provided in the cover portion 29. An annular thrust plate 60ᵃ surrounds the shaft 46 at the bottom. The top end portion of the shaft 46 is surrounded by an annular plate 60ᵇ secured by means of countersunk screws 60ᶜ to the hub portion 51 of the spider 50, securing the gear 45 against axial displacement upon the hub portion 51 of the spider 50. The annular plate 60ᵇ has oil openings 60ᵈ. A detachable auxiliary cover plate 62 over the guide bearing 61 is provided with a transparent top 63 through which the bearing 61 is visible for viewing a lubricating oil flow hereinafter described.

The pinion 48 meshes with another large gear 64 that is larger than the first large gear 45, and keyed as at 65 to a second gear shaft or second counter-shaft 66, and it rotates together with a pinion 67 below and here shown to be integral with the second counter-shaft 66. This second counter-shaft 66 has a lower or thrust bearing 68 provided in the horizontal portion 37 of the larger pocket portion 39 of the frame structure 24, and it has an upper or guide bearing 69 provided in the cover portion 29. The pinion 67 in turn meshes with an idler gear 70 through which it drives the bull gear 22. The idler gear 70 has a running fit upon the gear shaft 43 which is herein called "the third or idler shaft" and the lower end of which is here shown to be fixed in a bearing socket 71 which is part of the horizontal portion 37 of the larger pocket section 39. A holding screw 72 is shown to fix the idler shaft 43 in its socket 71, the upper end of the idler shaft being held in the lug or eye portion 44 of the frame structure 24. The corresponding gears of the opposite reduction gear train are designated by the same numerals as the gears just described, but distinguished from them by the "prime" sign.

From the plan view (Fig. 4) it will be seen that the vertical axes of all the gears that constitute the two symmetrically disposed drive gear trains intersect with a diameter of the bull gear 20, the direction of which diameter is designated as A—A. Otherwise expressed, in plan view the centers of all the gears are aligned upon a diameter of the bull gear 20. For purposes hereinafter explained, the direction of a line intersecting the line A—A at right angles horizontally and in the center of the motor pinion 27, according to this plan view, is herein designated as B—B. The drive motor 28 has a flange 73 by means of which it is mounted upon a central cylindrical portion 74 formed on the cover portion 29 and defining a central opening 75 therein, through which the motor pinion 27 engages the two symmetrical drive gear trains. Provision is made for adjusting the motor, or rather for permitting it to adjust itself in a horizontal direction, namely, in the direction B—B (as above defined) about the center of the bull gear 20. By permitting of bodily adjustability of the motor unit including the motor pinion 27 in this horizontal direction, the motor pinion is allowed to adjust itself to a mean optimum position with respect to its simultaneous driving engagement with the gears 45 and 45' of the two symmetrical gear trains. The mode of this adjustment and the advantages obtainable thereby will be further explained. After the pinion 27 has been allowed to adjust itself to an optimum position along the line B—B, the motor 28 is fixed in this position by clamping the motor flange 73 down upon its seat, namely, upon the cylindrical portion 74 of the cover 29.

In order to provide for the bodily adjustability of the motor along the horizontal line B—B, the cylindrical portion 74 of the cover portion 29 is provided (see Fig. 12 to Fig. 16) with a pair of inwardly and horizontally extending guide lugs 76 and 77 which are diametrically opposed to one another. Each guide lug has a horizontal groove 78 and 79 respectively, which grooves are horizontally and longitudinally aligned, their common center line in plan view being in the direction of line B—B and intersecting theoretically with the vertical axis of the bull gear 20. The motor flange 73 is provided at its underside with a pair of key members 80 and 82 respectively that correspond to and have a sliding fit in the respective grooves 78 and 79 of the stationary guide lugs 76 and 77, when the motor unit inclusive of the motor gear 27 is in place upon the cover 29. The means for fixing the motor in its self-adjusted position upon the cover 29 comprise a pair of hook-shaped clamping members 82 and 83 which are also diametrically disposed to each other since they are fastened to the outside of the cylindrical portion 74 of the cover 29 and in line with the grooves 78 and 79, as well as with the guide lugs 76 and 77. The clamping members 82 and 83 extend upwardly and over the motor flange 73, and have vertical set screws 82ᵃ and 83ᵃ respectively in their upper end overlying the motor flange 73, by means of which set screws the motor flange 73 can be tightly seated upon the cover 29.

There is provided for the driving gear elements or gear trains of this mechanism a lubricating system whereby oil is automatically circulated therethrough. An oil sump or chamber in the form of an oil casing 84 is provided centrally at the underside of the frame structure 24 and fastened thereto by means of a flange and bolt connection 85. Mounted inside the oil casing 84 is an oil pump 86 which is driven directly by the motor 28 through a universal shaft connection 87 that couples the motor pinion 27 with the pump 86, and extends through a central opening 88 in the top portion 31 of the frame structure 24. An oil pressure and delivery pipe 89 extends from the pump 86 (see detail Fig. 6) through the wall of the oil casing 84 and by way of a sealing gland 90 therein. The oil delivery pipe 89 by way of a T-connection 91 then splits into the oil pressure branches 92 and 92' leading in opposite directions to supply the respective symmetrically arranged gear trains of this drive mechanism. Because of the symmetry of the arrangement, there need only be described the oil flow from branch 92 over the gear train that is contained in the pocket 34 of the frame structure 24, and its return to the oil casing 84 from where it is recirculated by the pump 86. The branch pressure pipe 92 leads the oil from below into the socket that holds the lower bearing 60 of the counter-shaft 46 of the gear train. An axial duct 93 is provided in the counter-shaft 46 through which the oil is forced upwardly to issue from the upper end of the counter-shaft 46 and underneath the transparent plate 63, to continue by cascading downwardly, passing through oil ducts 94 provided in the cover 29 around the upper bearing 61 of counter-shaft 46. In this way the oil supplies not only the lower bearing 60 but also the upper bearing 61 of the counter-shaft 46. In cascading downwardly from this point the oil lubricates the hub as well as the teeth of the gear 45 which in turn lubricates the teeth of the motor pinion 27. The oil gravitates downwardly into the pocket section 41 where it is somewhat detained by an oil weir 95, whereby it lubricates the pinion 48 as well as the gear 64. In overflowing the oil weir 95 the oil continues cascading downward over the vertical portion 30 and into the pocket section 39 where it lubricates the pinion 67 and the idler gear 70, as well as the lower bearing 68. From the lowest point of the pocket section 39 the oil is then withdrawn or gravitates through the return pipe 96 into the oil casing 84 to be picked up again by the suction piece 97 of the pump 86 for recirculation through the drive gear mechanism. A symmetrical oil return pipe 96' enters the oil casing 84 at the opposite side returning the oil from the pocket 35 of the frame structure 24.

A pair of symmetrically disposed manholes 98 and 99 are provided in the horizontal top portion 31 of the frame structure 24 and they are so disposed as to come within the space defined by the inner cylindrical portion 30 of the frame structure 24. Through these manholes access may be had to the underside of the structure 24 and thereby to the oil casing 84 and the oil pump 86 and the oil connections leading from and to the oil casing 84, and thereby access may also be had to the interior of the hollow center pier 13, in which rungs 100 are provided for descending.

In describing the operation of the drive mechanism it is to be remembered that one of the problems of this invention is how to distribute equal portions of the driving torque from the motor pinion 27 through a pair of opposedly arranged gear trains, to diametrically opposed points of driving engagement with the bull gear 20, and to maintain such equalized or interbalanced torque distribution throughout the operation of the drive mechanism.

In the embodiment herein illustrated, a substantially even torque distribution of this kind is established by reason of the resilient torque compensating device that is interposed in each of the symmetrically disposed gear trains, as above described. Whereas only one of these gear trains has been described in detail and its parts designated by numbers, it will be noted that corresponding and symmetrically disposed identical parts of the other gear train which might be called the companion gear train, are designated by the identical numbers although distinguished by the "prime" sign.

The compression springs 57 in the one gear train and the corresponding springs 57' in the companion gear train are so designed and adjusted, that each compensating device is capable of transmitting about half the total torque load without causing any appreciable compression of the springs. But when an excess of half the driving torque load is imposed upon one gear train, for instance, through the gear 45, because of the inherent manufacturing inaccuracies of the gear mechanism as a whole, that excess driving torque will then cause a corresponding compression of the compensating springs 57 in that gear train. This spring compression is equivalent to a temporary or momentary rotational slipping between the gear 45 and its associated pinion 48. In other words, this excess load, if absorbed through the compression of the compensating springs 57, will allow the motor pinion 27 in turn to acquire sufficient load contact with the companion gear train, namely, through the gear 45', so that this companion gear train will take over the absorbed excess load from the first mentioned gear train. This resilient shifting of absorbed excess load will, of course, be reversed when the companion gear train in turn should happen to be the one whose compensating springs must absorb load that is in excess of half the total torque load. It will be understood in the actual operation of this drive mechanism, both compensating devices will be constantly so balanced against each other in a resilient manner, that the driving torque loads on each gear train are continually equalized so that practically no load appreciably in excess of half the torque load will be transmitted through each of the two symmetrical gear trains. In this manner substantially even and minimum torque transmitting pressures are maintained throughout both gear trains, with the resultant advantages that the drive gears are subjected to a minimum of wear and tear, that consequently the construction may be made lighter and cheaper, that the mechanism can be operated evenly and noiselessly, and that a relatively powerful torque can be transmitted with relatively small power requirements. The power requirement is a factor of importance depending upon the speed at which the bull gear 20 is to be rotated, and upon the character and density of the slurry that is to be agitated by the rotary structure 14, or the load resistance of sediment that is being engaged by the rake arms 16 upon the bottom 11 of the tank 10.

While the embodiment herein shown discloses a pair of opposedly arranged gear trains, it should be understood that the invention is not limited to this specific embodiment, but may also comprise arrangements providing more than two such gear trains, for instance three gear trains disposed at 120 degree angle from each other, each gear train provided with the torque absorbing equalizing device and therefore adapted to transmit one-third of the total torque load, as the three gear trains are resiliently interbalanced by the equalizing devices. By using more than two gear trains each of which assumes a substantially equal share of the total torque load, a relatively greater total torque can be transmitted in a mechanism having substantially the same diameter low speed or bull gear as the mechanism with only two gear trains. However, it will be noted that where more than two gear trains are provided, the position of the axis of rotation of the centrally disposed high speed gear or motor pinion is fixed and predetermined and non-adjustable.

I claim:

1. A drive gear mechanism comprising a stationary frame, an internally toothed low speed gear mounted upon said frame for rotation about a vertical axis, a vertical drive shaft having fixed thereon a high speed driving pinion rotatable about a fixed vertical rotary axis substantially coaxial with the rotary axis of said rotary internally toothed gear, a pair of gear trains disposed substantially symmetrically with respect to the high speed driving pinion for transmitting substantially half of the driving torque to each of two corresponding diametrically opposed points of driving engagement of the low speed gear, resilient torque absorbing means interposed in each gear train, whereby the respective shares of the driving torque thus transmitted to the low speed gear are substantially interbalanced and equalized and a substantially true torque transmission is obtained from said high speed pinion to said low speed gear, and means whereby said vertical drive shaft is adjustable in a horizontal direction which is at right angles to a diameter of said low speed gear, which diameter is defined by said opposed points of driving engagement on said low speed gear.

2. A drive gear mechanism comprising a stationary frame, an internally toothed low speed gear mounted upon said frame for rotation about a vertical axis, a vertical drive shaft having fixed thereon a high speed driving pinion rotatable about a fixed vertical rotary axis substantially coaxial with the rotary axis of said rotary internally toothed gear, a plurality of gear trains mounted on said frame for transmitting proportionate shares of the motor driving torque to a plurality of corresponding points of driving engagement with said low speed gear, which points of engagement are substantially evenly spaced from one another along the pitch diameter of the low speed gear, each of said gear trains comprising a plurality of pairs of coaxial reduction gears, and resilient torque absorbing means operatively interposed in each gear train between the two gears thereof which constitute the pair closest to the high speed driving gear, which pair of gears comprises an upper larger gear and a lower smaller gear, said torque absorbing means comprising a spider element coaxial and fixedly connected with said smaller gear and having a hub portion upon which in turn is rotatable said larger gear, each arm of said spider extending into cooperative relationship with a corresponding portion of said larger gear, and a compression coil spring operatively interposed between each of the spider arms and said corresponding portion of the larger gear, whereby the torque from the larger gear is transmitted to the smaller gear.

3. A drive gear mechanism comprising a stationary frame, an internally toothed low speed gear mounted upon said frame for rotation about a vertical axis, a vertical drive shaft having fixed thereon a high speed driving pinion rotatable about a fixed vertical rotary axis substantially coaxial with the rotary axis of said rotary internally toothed gear, a plurality of gear trains mounted on said frame for transmitting proportionate shares of the motor driving torque to a plurality of corresponding points of driving engagement with said low speed gear, which points of engagement are substantially evenly spaced from one another along the pitch diameter of the low speed gear, each of said gear trains comprising a plurality of pairs of coaxial reduction gears, and resilient torque absorbing means operatively interposed in each gear train, between the two gears thereof which constitute the pair closest to the high speed driving gear, whereby said shares of the driving torque are substantially interbalanced and equalized and a substantially true torque transmission is obtained from said high speed pinion to said low speed gear.

CHARLES H. SCOTT.